US010986307B2

(12) United States Patent
Rios et al.

(10) Patent No.: US 10,986,307 B2
(45) Date of Patent: Apr. 20, 2021

(54) METHODS AND APPARATUS TO MANAGE AUDIOVISUAL RECORDING IN A CONNECTED VEHICLE

(71) Applicant: AT&T intellectual Property I, L.P., Atlanta, GA (US)

(72) Inventors: Roque Rios, Middletown, NJ (US); James Gordon Beattie, Jr., Bergenfield, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 110 days.

(21) Appl. No.: 15/713,223

(22) Filed: Sep. 22, 2017

(65) Prior Publication Data

US 2018/0013976 A1    Jan. 11, 2018

Related U.S. Application Data

(63) Continuation of application No. 14/935,023, filed on Nov. 6, 2015, now Pat. No. 9,774,816.

(51) Int. Cl.
*H04N 5/77* (2006.01)
*G07C 5/00* (2006.01)
*H04N 5/44* (2011.01)
*G07C 5/08* (2006.01)

(52) U.S. Cl.
CPC ............ *H04N 5/772* (2013.01); *G07C 5/008* (2013.01); *G07C 5/0866* (2013.01); *H04N 5/44* (2013.01)

(58) Field of Classification Search
CPC . H04N 5/772; H04N 5/77; H04N 5/44; G07C 5/0866; G07C 5/008; B60R 11/04

USPC ......................................................... 386/224
See application file for complete search history.

(56) References Cited

U.S. PATENT DOCUMENTS

| | | | |
|---|---|---|---|
| 7,023,333 B2 | 4/2006 | Blanco et al. |
| 7,768,548 B2 | 8/2010 | Silvernail et al. |
| 8,275,054 B2 | 9/2012 | Schenk et al. |
| 8,446,469 B2 | 5/2013 | Blanco et al. |
| 8,520,070 B1 | 8/2013 | Englander et al. |
| 8,818,626 B2 | 8/2014 | Bowden et al. |
| 9,030,292 B2 | 5/2015 | Torgersrud et al. |
| 9,083,858 B2 | 7/2015 | Tseng |

(Continued)

OTHER PUBLICATIONS

Mcgehee et al., "Extending parental mentoring using an event-triggered video intervention in rural teen drivers", Journal of Safety Research 38 215-227, National Safety Council, Mar. 28, 2007, (13 pages).

(Continued)

*Primary Examiner* — Helen Shibru
(74) *Attorney, Agent, or Firm* — Amin, Turocy & Watson, LLP

(57) ABSTRACT

Methods, apparatus, systems and articles of manufacture disclosed herein may be used to manage audiovisual recording in a connected vehicle. An example disclosed method includes accessing a profile having a recording parameter and a first quality selected by a user from a recording server. The example method also includes comparing a reading from a vehicle sensor to the recording parameter in the profile to determine whether to record a video. Additionally, the example method includes, in response to determining to record the video, storing the video using the first quality to a memory located in the vehicle.

20 Claims, 6 Drawing Sheets

(56) References Cited

U.S. PATENT DOCUMENTS

| | | |
|---|---|---|
| 9,189,897 B1 | 11/2015 | Stenneth |
| 10,015,462 B1* | 7/2018 | Quach ............... H04N 5/76 |
| 2003/0041329 A1 | 2/2003 | Bassett |
| 2003/0143993 A1 | 7/2003 | Nagaoka |
| 2003/0151663 A1 | 8/2003 | Lorenzetti et al. |
| 2004/0008255 A1 | 1/2004 | Lewellen |
| 2005/0007459 A1 | 1/2005 | Kawai et al. |
| 2005/0259965 A1 | 11/2005 | Ishito |
| 2006/0055521 A1 | 3/2006 | Blanco et al. |
| 2007/0135979 A1 | 6/2007 | Plante |
| 2009/0109292 A1 | 4/2009 | Ennis |
| 2009/0322890 A1 | 12/2009 | Bocking et al. |
| 2010/0202755 A1 | 8/2010 | Ariya |
| 2010/0235891 A1* | 9/2010 | Oglesbee ............ H04L 67/1095 726/5 |
| 2011/0043624 A1 | 2/2011 | Haug |
| 2011/0043631 A1* | 2/2011 | Marman ............. H04N 9/7921 348/143 |
| 2012/0283894 A1 | 11/2012 | Naboulsi |
| 2013/0133048 A1 | 5/2013 | Wyn-Harris |
| 2013/0155255 A1 | 6/2013 | Yu |
| 2013/0286048 A1 | 10/2013 | Sternitzke |
| 2014/0002651 A1 | 1/2014 | Plante |
| 2014/0306826 A1* | 10/2014 | Ricci ................... H04W 4/21 340/573.1 |
| 2015/0077556 A1* | 3/2015 | Reed ..................... H04N 7/183 348/148 |
| 2015/0145995 A1* | 5/2015 | Shahraray ............ H04W 4/70 348/148 |
| 2015/0228066 A1* | 8/2015 | Farb .................. G06K 9/00805 348/148 |
| 2016/0085802 A1 | 3/2016 | Rios, III et al. |
| 2016/0114686 A1* | 4/2016 | Beattie, Jr. ............ B60L 11/182 320/108 |
| 2016/0292511 A1* | 10/2016 | Ayalasomayajula ........................ G06K 9/00751 |
| 2016/0371553 A1 | 12/2016 | Farnham, IV et al. |
| 2017/0028935 A1 | 2/2017 | Dutta et al. |
| 2017/0076597 A1* | 3/2017 | Beattie, Jr. ............ G08G 1/0129 |
| 2019/0392107 A1* | 12/2019 | Ricci ................... G06F 30/392 |

OTHER PUBLICATIONS

United States Patent and Trademark Office, "Non-Final Office Action", issued in connection with U.S. Appl. No. 14/935,023, dated Oct. 18, 2016 (10 pages).

United States Patent and Trademark Office, "Notice of Allowance", issued in connection with U.S. Appl. No. 14/935,023, dated May 26, 2017 (6 pages).

* cited by examiner

METHODS AND APPARATUS TO MANAGE AUDIOVISUAL RECORDING IN A CONNECTED VEHICLE

RELATED APPLICATION

This patent arises from a continuation of U.S. patent application Ser. No. 14/935,023, (Now U.S. Pat. No. 9,774,816) which was filed on Nov. 6, 2015. Priority to U.S. patent application Ser. No. 14/935,023 is hereby claimed. U.S. patent application Ser. No. 14/935,023 is hereby incorporated herein by reference in its entirety.

FIELD OF THE DISCLOSURE

This disclosure relates generally to connected vehicles, and, more particularly, to methods and apparatus to manage audiovisual recording in a connected vehicle.

BACKGROUND

Increasingly, vehicles are manufactured with cellular voice and data network radio devices and an external antenna to facilitate a connection to a network. These vehicles, referred to as connected vehicles, have their own subscriber identification modules (SIMs) that facilitate connection to the cellular network. In particular, the SIMs, when activated, allow the connected vehicle to connect to a cellular data network via a cellular protocol (e.g., Global System for Mobile Communications (GSM), Universal Mobile Telecommunications System (UMTS), Evolution-Data Optimized (EDVO), Enhanced Data rates for GSM Evolution (EDGE), Long Term Evolution (LTE), etc.) that may be used for navigation, multimedia streaming, Internet browsing, etc. Additionally, video cameras are increasingly being installed on vehicles for recreation, safety, and/or insurance purposes.

BRIEF DESCRIPTION OF THE DRAWINGS

The figures are not to scale. Wherever possible, the same reference numbers will be used throughout the drawing(s) and accompanying written description to refer to the same or like parts

DETAILED DESCRIPTION

Figure 1:
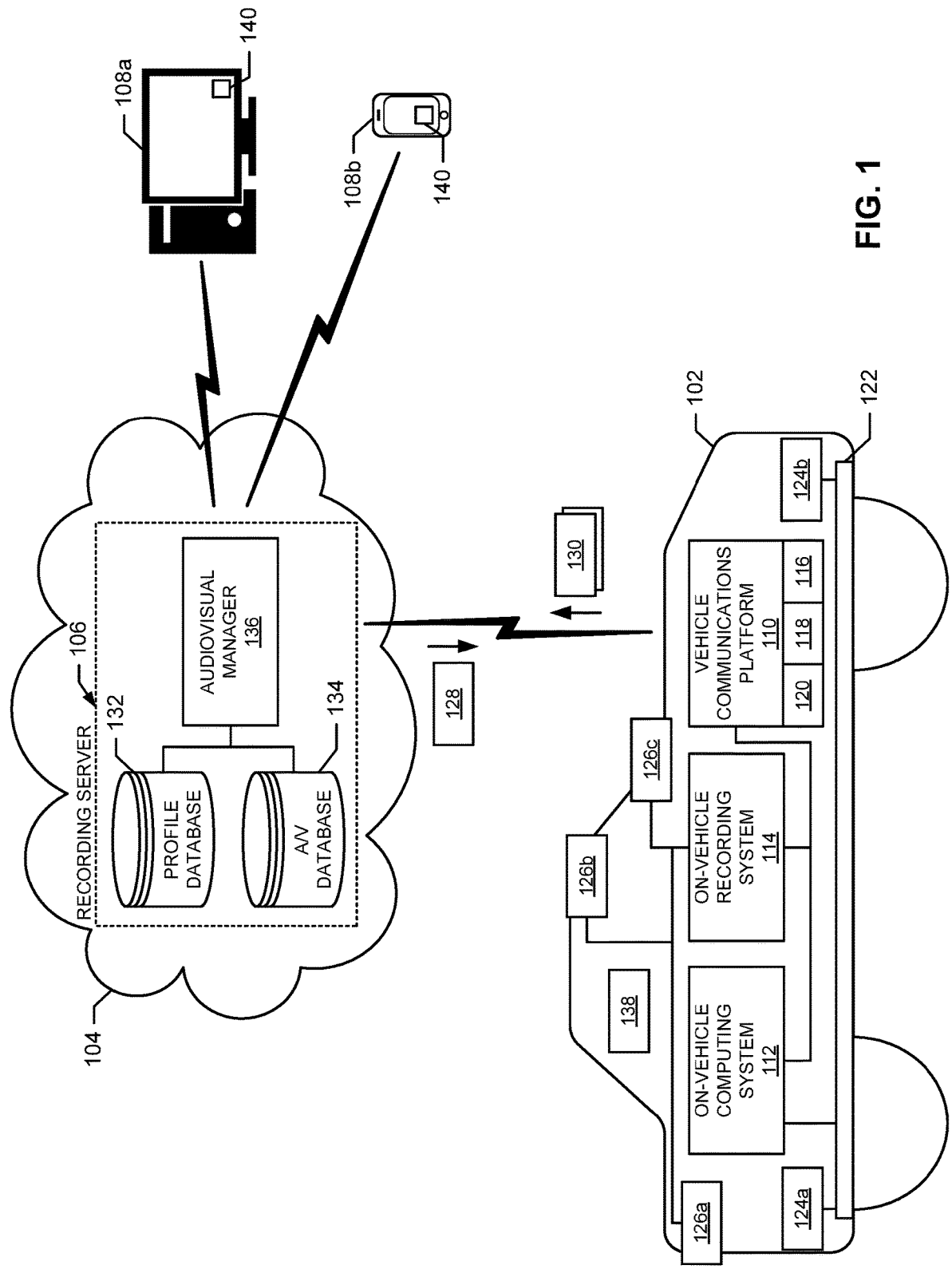
FIG. 1 illustrates an example system operating in accordance with the teaching of this disclosure to manage audiovisual recording in a connected vehicle.

Examples disclosed herein may be used to manage audiovisual recording in a connected vehicle. Increasingly, connected vehicles are manufactured with one or more on-board cameras (e.g., dashboard cameras, interior cameras, rear-facing cameras, etc.). These cameras allow drivers to create recordings to, for example, record a scenic trip, monitor a driver's driving habits (e.g., monitor an employee driving a company car, monitor a teenager, etc.), record surroundings in the event of an accident, etc. In many cases, memory for storing recordings is limited (e.g., sixteen gigabytes, one hundred gigabytes, etc.). As such, some recording systems record segments of video to the memory in a continuous loop (e.g., in a circular buffer, etc.). The oldest segments are deleted and/or are overwritten to enable new segments to be recorded. In some examples, segments may be flagged as a segment to be preserved (e.g., a recording of an accident). In such examples, those flagged segments are not deleted and/or overwritten until they have been copied to some other memory. However, such systems are limited in that they require a great deal of user interaction to ensure that recordings that the user cares about are saved and/or not deleted.

As used herein, a connected vehicle is any vehicle (e.g., car, truck, sports utility vehicle, semi-trailer truck, boat, etc.) equipped with cellular network antenna(s) and software to facilitate connecting to a cellular network. In some examples, the connected vehicles also include an antenna and software to facilitate connecting to a wireless local area network (WLAN). Examples disclosed herein utilize a wireless (e.g., cellular, Wi-Fi®, etc.) connection between an on-vehicle recording system and a recording server. The on-vehicle recording system is connected to one or more cameras to record the surroundings and/or interior of the vehicle. From time to time, the on-vehicle recording system retrieves a profile from the recording server. For example, to ensure having the most up-to-date profile, the on-vehicle recording system may retrieve the profile from the recording server when the vehicle ignition is started (e.g., the key is turned to the start position, the ignition button is pressed, etc.). Alternatively or additionally, in some examples, the recording server pushes the profile to the vehicle when the profile is updated.

The example recording server may be operated by a cloud services provider that allows a subscriber to register a vehicle and create a profile. As used herein, a cloud service provider is an entity (e.g., AT&T, Amazon® Web Services, etc.) that provides storage and/or services via computing resources connected to the Internet. The subscriber uses an identifier (e.g., a vehicle identification number (VIN), an International Mobile Subscriber Identity (IMSI) associated with the vehicle, etc.) to associate the vehicle with the profile. In some examples, when ownership of the vehicle is transferred, an account associated with the vehicle is created with the cloud services provider. In some such examples, the subscriber (e.g., the owner of the vehicle) is able to manage (e.g., change credentials, manage profiles, etc.) the account. In some examples, the subscriber is able to manage profiles for multiple vehicles.

In examples disclosed herein, the profile defines, for example, what to record (e.g., which cameras to use for recording, etc.), where (geographically) to record, when to record (e.g., a specified time period, in response to an event, weather conditions during which recordings should be made, etc.), when to mark a recorded segment as important, which drivers to record, and/or a length of each recording segment (e.g., three minutes, five minutes, twenty minutes, etc.), etc. For example, an employer may record the dashboard camera and the interior camera when a company car is used during non-company hours. As another example, a parent might record the interior camera when a teenage driver is using the vehicle.

The example on-vehicle recording system records video segments to a memory in accordance with the profile. The example on-vehicle recording system is communicatively coupled (e.g. via an on-board computing system, via a controller area network (CAN) bus, etc.) to sensors (e.g., speedometers, accelerometers, radar, ultrasonic sensors, LIDAR, weight sensors, etc.) that the example on-vehicle recording system uses to detect events of interests (e.g., accidents, potential accidents, weather, etc.). Additionally, the example on-vehicle recording system is communicatively coupled to a global positioning system (GPS) receiver (e.g., via a vehicle communications system, etc.) that the example on-vehicle recording system uses to detect the location of the vehicle.

In some examples, recordings made by the on-vehicle recording system would cause a memory of the on-vehicle recording system to become full. In such examples, the on-vehicle recording system dynamically scales the quality (e.g., frame rate and/or resolution) of future recordings to prevent footage from being discarded. For example, to conserve space, the on-vehicle recording system may reduce the frame rate at which the video segments are recorded. In examples disclosed herein, dynamic scaling parameters are included as part of the profile and define, for example, minimum quality levels for particular settings and/or scenarios. For example, when recording a scenic drive, a high quality recording (e.g., no reduction in quality) may be desired. In contrast, for example, when recording an accident, a low quality recording may be acceptable because, for example, a license plate may still be visible using a low frame rate. In some examples, when the memory is near to being full, the on-vehicle recording system dynamically manages the memory. For example, the on-vehicle recording system may upload segments of the recorded video to the recording server over the cellular connection and/or may delete segments that are relatively old and/or not marked as important.

In examples disclosed herein, the on-vehicle recording system uploads recordings to the recording server using the wireless connection. In some examples, the profile defines how and/or when recordings should be uploaded. For example, the profile may instruct the on-vehicle recording system to upload recordings immediately after an important event (e.g., an accident) is detected, upload recordings upon detection of a high-speed connection to the recording server, and/or upload recordings when checkpoints are reached (e.g., geographic checkpoints, temporal checkpoints, etc.), etc.

The example recording server establishes connections with computing devices (e.g., desktop computers, laptop computers, smart phones, tablets, etc.). Using credentials (e.g., username, phone number, password, etc.) supplied by the recording server, the subscriber can view and/or retrieve the recorded segments from the recording server. Such an arrangement enables viewing of media segments recorded by the on-vehicle recording system when not in proximity to the vehicle itself. For example, a parent may be able to monitor a teenager when they are out driving, a corporate entity may be able to monitor an employee driving a company car, the subscriber may be able to provide video to an insurance company even without physical access to the vehicle, etc.

FIG. 1 illustrates an example system operating in accordance with the teaching of this disclosure to manage audiovisual recording in a connected vehicle 102. The example system includes the example connected vehicle 102, an example cloud service provider 104 hosting an example recording server 106, and example computing devices 108a, 108b (e.g., desktop computers, laptop computers, smart phones, tablets, etc.). In the illustrated example, the computing devices 108a, 108b communicatively couple to the recording server 106 via a wired or a wireless Internet connection. Additionally, the example connected vehicle 102 communicatively couples to the example recording server 106 via a wireless connection.

The example connected vehicle 102 includes an example vehicle communications platform 110, an example on-vehicle computing system 112, and an example on-vehicle recording system 114.

The example vehicle communications platform 110 is used to facilitate the connection between the example recording server 106 and the example on-vehicle recording system 114. In the illustrated example the vehicle communications platform 110 includes an example cellular communication device 116, an example WLAN communication device 118, and an example GPS receiver 120. The example cellular communication device 116 includes antenna(s), radio(s), and/or protocol(s) that facilitate a cellular connection (e.g., a GSM connection, a UMTS connection, an EDVO connection, an EDGE connection, an LTE connection, etc.) to a wireless service provider (e.g., AT&T®, Sprint®, Verizon®, etc.) The example WLAN communication device 118 includes antenna(s), radio(s), and/or protocol(s) that facilitate a wireless local area connection (e.g., using the Institute of Electrical and Electronics Engineers (IEEE) 802.11 protocol, etc.) between the vehicle communications platform 110 and a wireless router connected to the Internet. The example GPS receiver 120 receives signals from GPS satellites to determine a geographic location of the example connected vehicle 102. In some examples, the vehicle communications platform 110 connects (e.g., via Bluetooth®, via Wi-Fi®, etc.) to a cellular-connected device (e.g., a smart phone, a tablet, etc.). In some such examples, the vehicle communications platform 110 connects to the recording server 106 through the cellular connection of the cellular-connected device.

In the illustrated example of FIG. 1, the on-vehicle computing system 112 controls low-level systems (e.g., door lock controls, headlight controls, transmission controls, climate controls, etc.) connected to a CAN bus 122. The example CAN bus 122 has a physical component (e.g. a wire harness) and a communication component (e.g., a communication protocol used by the devices connected to the CAN bus 122). In the illustrated example, the on-vehicle computing system 112 communicates with one or more sensors 124a, 124b (e.g., speedometers, accelerometers, radar, ultrasonic sensors, LIDAR, weight sensors, etc.) via the CAN bus 122. The example on-vehicle computing system 112 uses the example sensors 124a, 124b to identify external events of interest (e.g., other vehicles in close proximity to the connected vehicle 102, accidents, etc.) and/or identify the driver of the example connected vehicle 102. For examples, the driver may be identified by weight, via an identifier embedded in a key fob, cell phone, and/or biometrics (e.g., fingerprint, voiceprint, etc.).

The example on-vehicle recording system 114 is communicatively coupled to cameras 126a-126c installed in the connected vehicle 102. The example cameras 126a-126c are installed in different locations to record the exterior and/or the interior of the connected vehicle 102. For example, one of the cameras 126a-126c may be installed to record a first view from a front windshield (e.g., a dash cam), one of the cameras 126a-126c may be installed to record a second view from the rear of the connected vehicle 102, and/or one of the cameras 126a-126c may be installed to record the driver of the connected vehicle 102.

As disclosed below in connection with FIG. 3, the example on-vehicle recording system 114 manages the example cameras 126a-126c based on a profile 128 received from the recording server 106. In some examples, the on-vehicle recording system 114 requests the profile 128 from the recording server 106. For example, the on-vehicle recording system 114 may request the profile 128 in response to an ignition switch of the connected vehicle 102 being set to the start position. Alternatively or additionally, in some examples, from time to time, the recording server 106 sends the profile 128 to the on-vehicle recording system 114. For example, the recording server 106 may send the profile 128 to the on-vehicle recording system 114 in response to the profile 128 being updated. From time to time (e.g., when indicated by the profile 128), the example on-vehicle recording system 114 sends, via the vehicle communications platform 110, video segment(s) 130 recorded by the camera(s) 126a-126c to the example recording server 106.

In the illustrated example, the recording server 106 includes an example profile database 132, an example video database 134, and an example audiovisual manager 136. The example profile database 132 is structured to store the profiles 128 in association with a connected vehicle identifier 138 and a subscriber identifier 140. The connected vehicle identifier 138 is a value (e.g., a VIN, an IMSI, an international mobile station equipment identity (IMEI), etc.) that uniquely identifies the connected vehicle 102. The subscriber identifier 138 is a value (e.g., a username, an account number, an IMSI, a telephone number, etc.) that uniquely identifies a subscriber to the cloud service provider 104. The example video database 132 stores video segments 130 received from the connected car 102 in association with the corresponding connected vehicle identifier 138 and the corresponding subscriber identifier 140. In some examples, the recording server 106 forwards some of the video segments 130 associated with the event of interest received from the connected vehicle 102 to a third-party. For example, if one of the video segments 130 is associated with an accident, the recording server 106 may forward the video segment 130 to an insurance company designated by the subscriber.

In the illustrated example of FIG. 1, the audiovisual manager 136 facilitates subscribers managing (e.g., creating, modifying, deleting, etc.) the profile 128 and the video segment(s) 130 associated with the subscriber identifier 140 of the subscriber. The example audiovisual manager 136 communicatively couples to the computing devices 108a, 108b. For example, the audiovisual manager 136 may provide a web interface via the Internet to which the communication device 108a connects. As another example, the audiovisual manager 136 may communicatively couple with the computing devices 108b via an application installed on the computing device 108b. Additionally, the example audiovisual manager 136 provides an interface to allow the subscriber to (a) associated subscriber's connected vehicle(s) 102 to the profile 128 (e.g., via the connected vehicle identifier 138), and (b) customize their profile 128.

In the illustrated example, the audiovisual manager 136 also facilitates the subscriber managing, playing and/or downloading the video segment(s) on their computing device(s) 108a, 108b. In some examples, the audiovisual manager 136 performs post-processing functions on the video segments 130. For example, the audiovisual manager 136 may compress the video segments 130 and/or may append together video segments from a same time that were recorded by different ones of the cameras 126a-126c.

Figure 2:
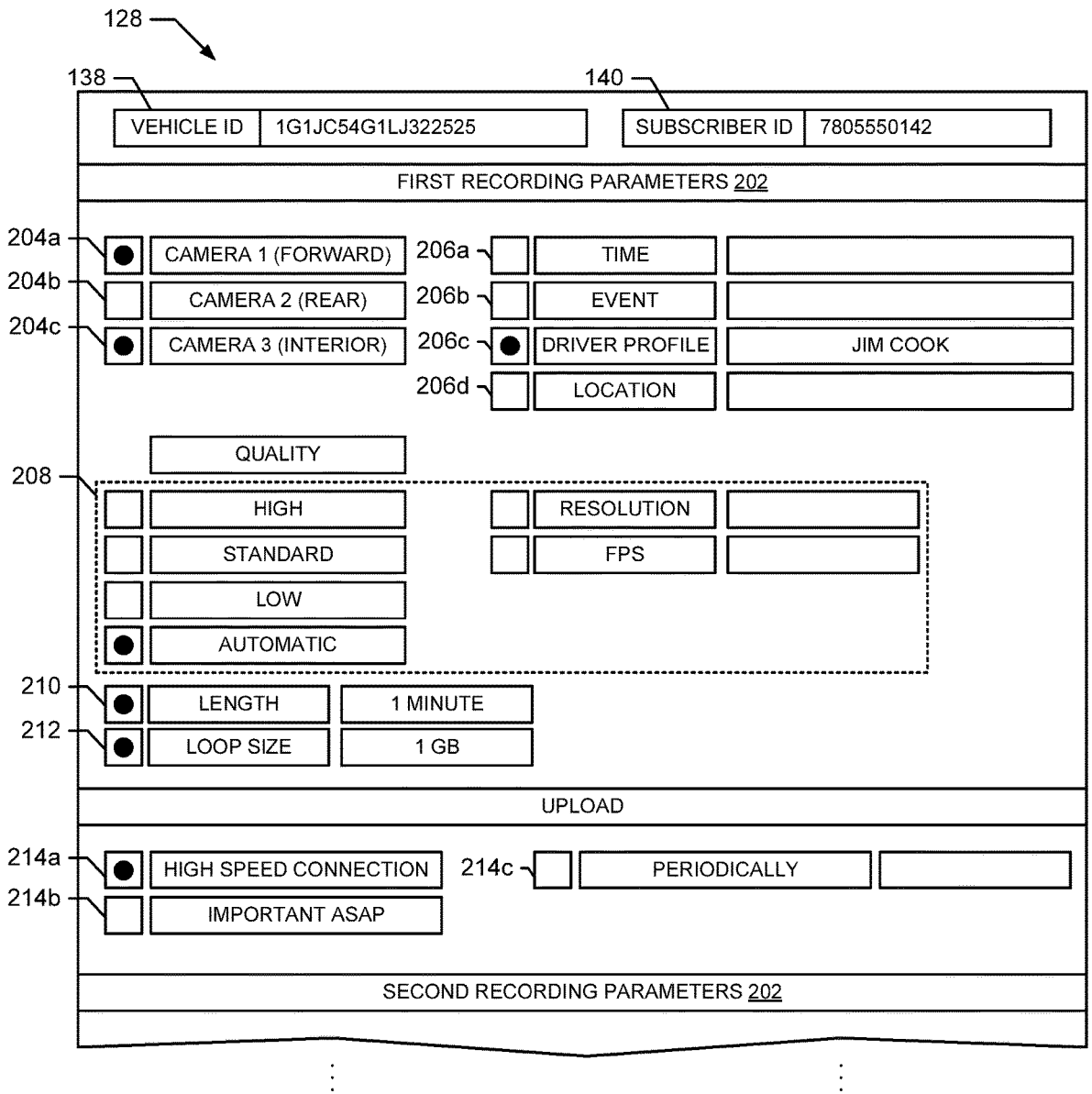
FIG. 2 illustrates an example profile, generated by an owner of the connected vehicle, which is used to manage audiovisual recording in the connected vehicle.

FIG. 2 illustrates an example profile 128 generated by the owner of the connected vehicle 102 of FIG. 1, which is used by the example on-vehicle recording system 114 of FIG. 1 to manage recording of video segments 130 (FIG. 1). The example profile 128 includes the vehicle identifier 138 associated with the connected vehicle 102 and the subscriber identifier 140 associated with the owner. In the illustrated example, the profile 128 includes one or more sets of recording parameters 202. The example sets of recording parameters 202 define (i) which camera(s) 126a-126c (FIG. 1) are going to record the video segments 130 (FIG. 1), (ii) when to record the video segments 130, and/or (iii) what quality at which to record the video segments 130. The profile 128 may include multiple sets of recording parameters 202 that each define how the on-vehicle recording system 114 is record the video segments 130 in different scenarios. For example, a first set of recording parameters 202 may define parameters for when a particular driver is driving the connected vehicle 102, and a second set of recording parameters 202 may define parameters for when the vehicle is near a particular location. In some examples, the subscriber, via the profile 128, may select priorities for the sets of parameters 202. In such examples, when the on-vehicle recording system 114 is managing (e.g., uploading, deleting, etc.) the memory storing the video segments 130, the on-vehicle recording system 114 uses the priorities to determine which video segments 130 are to be uploaded and/or deleted.

The example set of recording parameters 202 includes camera fields 204a-204c that correspond to the cameras 126a-126c of the connected vehicle. The camera fields 204a-204c allow the subscriber to define which one(s) of the cameras 126a-126c are going to record the video segments 130. For example, one of the camera fields 204a-204c may correspond to the forward facing camera 126c.

Additionally, the example set of recording parameters 202 includes condition fields 206a-d that define when the cameras 126a-126c corresponding the selected camera fields 204a-204c are to record the video segments 130. In the illustrated example, the set of recording parameters 202 includes a time condition field 206a. The example time condition field 206a is used to define a time period in which the cameras 126a-126c are to record the video segments 130. For example, the subscriber may specify that video segments 130 are to be recorded between 8:30 am and 4:30 pm.

In the illustrated example, the set of recording parameters 202 includes an event condition field 206b. The example event condition field 206b is used to specify events that cause the cameras 126a-126c to record the video segments 130. In some examples, the subscriber chooses from a list of events defined by the cloud service provider 104 (FIG. 1). In some such examples, the cloud service provider 104 defines events based on the sensor(s) 124a, 124b (FIG. 1) installed on the connected car 102. For example, a selectable event may be detect a fast approaching vehicle from rear short-ranged ranged radar sensors or detect engagement of antilock brakes. In some such examples, when one of the events is selected by the subscriber, the event condition field 206b includes information (e.g., which ones of the sensors 124a, 124b to monitor, thresholds for the values produced by the sensors 124a, 124b, etc.) used to detect the selected event.

The example set of recording parameters 202 includes a driver profile condition field 206c. The example driver profile condition field 206c is used to specify recording the video segments 130 when a specific driver is detected. In some examples, the driver is detected by using a weight sensor on the driver's seat, detecting a specific key fob associate with the driver, and/or detecting biometric data (e.g., fingerprint on starter button, facial recognition, etc.) corresponding the driver, etc. For example, the subscriber may specify via the driver profile condition field 206c that the cameras 126a-126c are to record the video segments when the subscriber's teenage son is driving.

The example set of recording parameters 202 includes a location condition field 206d. The example location condition field 206d is used to specify a geographic location at which the video segments 130 are to be recorded. In some examples, the location condition field 206d is used to specify an initial location to start recording and a final location to stop recording. In some such examples, the location condition field 206d is also used to specify a route between the initial location and the final location. For example, the subscriber may use the location condition field 206d to specify the initial location of (42°51'57.0"N, 122°10'08.2"W) and the final location of (42°53'58.8"N, 122°05'54.2"W). In some examples, the location condition field 206d specifies a series of coordinates that define a route. Alternatively or additionally, in some examples, the location condition field 206d is also used to specify a location and a radius around the location in which to record the video segments. For example, the subscriber may specify a location of (47°19'35.0"N, 114°12'58.1"W) and a radius of 3 miles.

In the illustrated example of FIG. 2, the set of recording parameters 202 includes quality fields 208. The example quality fields 208 are used to define the quality (e.g., resolution, frames per second (fps), etc.) of the video segments 130. In some examples, the quality fields 208 include predefined options (e.g., high quality, standard quality, low quality, automatic, etc.). For example, a high quality option may correspond to a resolution of 1080p and a frame rate of 60 fps, and a standard quality option may correspond to a resolution of 480p and a frame rate of 30 fps. Additionally or alternatively, in some examples, the quality fields 208 include options to select from available resolutions (e.g., 240p, 360p, 480p, 720p, 1080p, etc.) and/or available frame rates (e.g., 1 fps, 10 fps, 24 fps, 30 fps, 60 fps, etc.). In some examples, the options for the quality fields 208 is limited to the capabilities of the cameras 126a-126b. Changing values the quality fields 208 affect the file size of the video segments 130. For example, increasing the resolution increases file size of the corresponding video segments 130, and decreasing the frame rate decreases the filed size of the corresponding video segments 130. In some examples, the set of recording parameters 202 includes a video segment length field 210 that is used to defined the length (e.g., in seconds, in file size, etc.) of the video segments 103.

In some examples, the set of recording parameters 202 includes a buffer loop size field 212 that is used to define the size (e.g., in bytes, etc.) of a memory buffer that stores the video segments 130. For example, the subscriber may set the buffer loop size field 212 to 1 GB. In such examples, the buffer loop size field 212 defines the maximum size (in bytes, etc.) of the aggregated video segments 130 corresponding to the profile 128. A larger value in the buffer loop size field 212 allows more video segments 130 to be recorded before older video segments 130 are overwritten.

In the illustrated examples, the set of recording parameters 202 includes video segment upload fields 214a-214c. The example video segment upload fields 214a-214c are used to specify when the video segments 130 stored in the corresponding memory buffer are to be uploaded to the recording server 106. In the illustrated example, one of the video segment upload fields 214a-214c allows the subscriber to specify that the corresponding video segments 130 are to be uploaded when the connected vehicle 102 (e.g., via the vehicle communications platform 110) is connected to the cloud service provider 104 via a high speed connection (e.g., a WLAN connection, etc.). In some examples, one of the video segment upload fields 214a-214c allows the subscriber to specify that the corresponding video segments 130 are to be uploaded (e.g., via a cellular data connection) as soon as the video segments 130 are recorded and/or as soon as the connected vehicle 102 is connected to a network (e.g., a WLAN, a cellular network, etc.). In such a manner, the video segments 130 can be made available to view (e.g., via the computing devices 108a, 108b) soon after the video segments 130 are recorded. In some examples, one of the video segment upload fields 214a-214c allows the subscriber to specify a period and/or a time that the corresponding video segments 130 are to be uploaded. For example, the subscriber may specify that the video segments are to be uploaded every day at 1:00 am.

In some examples, the profile 128 is generated and stored in a tag-based format (e.g., Extensible Markup Language (XML), Hypertext Markup Language (HTML), JSON, etc.) to allow the fields 204a-204c, 206a-206d, 208, 210, 212, 214a-214c to be parsed by the on-vehicle recording system 114.

Figure 3:
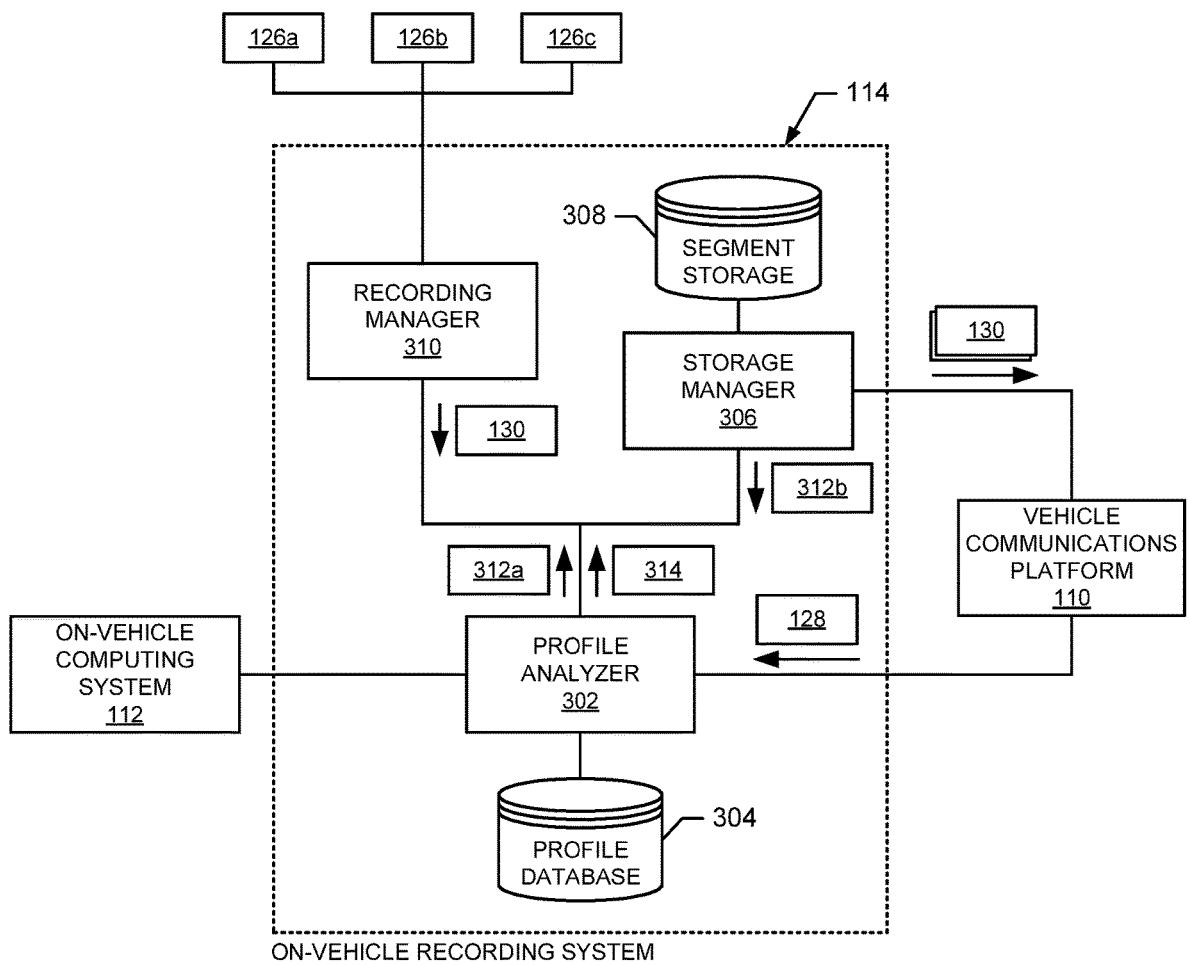
FIG. 3 illustrates an implementation of the example on-vehicle recording system of FIG. 1.

FIG. 3 illustrates an implementation of the example on-vehicle recording system 114 of FIG. 1. In the illustrated example, the on-vehicle recording system 114 includes an example profile analyzer 302, an example profile database 304, an example storage manager 306, an example segment storage 308, and an example recording manager 310.

The example profile analyzer 302 is communicatively coupled to the example vehicle communications platform 110. The example profile analyzer 302 receives the profile 128 (FIGS. 1 and 2) from the recording server 106 of FIG. 1 via the example vehicle communications platform 110. In some examples, the profile analyzer 302 requests the profile 128 when the connected vehicle 102 (FIG. 1) is started. Additionally or alternatively, in some examples, the recording server 106 send the profile 128 to the profile analyzer 302 when the connected vehicle 102 connects to the cloud service provider 104. The example profile analyzer 302 stores the profile 128 in the profile database 304.

In the illustrated example, the profile analyzer 302 parses the profile 128 create trigger events. The example event triggers are based on the condition fields 206a-d in the sets of recording parameters 202 (FIG. 2) of the profile 128. For example, if the location condition field 206d specifies a particular location and/or route, the profile analyzer 302 sets an event trigger to detect when the connected vehicle 102 is at the location and/or on the route. The example profile analyzer generates a quantity of the event triggers corresponding to the quantity of the sets of recording parameters 202 in the example profile 128. For example, the profile analyzer 302 may generate a first event trigger based on a first set of parameters 202 and a second event trigger based on a second set of parameters 202. To detect when one(s) of the event triggers is/are satisfied, the example profile analyzer 302 is communicatively couple to the example on-vehicle computing system 112 and/or the GPS receiver 120 (FIG. 1) of the example vehicle communications platform 110.

In some examples, the profile analyzer 302 maintains default settings that are used when the event trigger(s) are not satisfied. That is, for such examples, the default settings are used to record the video segments 130, and when the event trigger(s) are satisfied, the default settings are overridden by the settings defined in the profile 128. For example, the default settings may specify to record the video segments 130 using the front-facing camera 126c when the connected vehicle 102 is standing still and/or moving forward (e.g., shifted into a driver gear, etc.), and to record the video segments 130 using the rear-facing camera 126a when the connected vehicle 102 is moving backwards (e.g., shifted into reverse gear, etc.) As another example, the default setting may specify the resolution to be 320p and the frame rate to be 0.5 fps. In some such examples, when one of the event triggers is satisfied, the profile analyzer 302 overrides the default settings (e.g., which camera(s) 126a-126c, the resolution, the frame rate, etc.) until the event trigger is no longer satisfied.

In some examples, the profile analyzer 302 receives information from another vehicle system associated with the on-vehicle computing system 112. For example, the on-vehicle computing system 112 may include a driver identification system. In such an example, when the driver is identified, the on-vehicle computing system 112 communicates the identity of the driver to the profile analyzer 302. In some examples, the on-vehicle communication system 112 forwards information from the sensors 124a, 124b to the profile analyzer 302. For example, the profile analyzer 302 may receive information from an accelerometer and/or from an anti-lock brake system to determine whether an event of interest (e.g., an accident, etc.) may be occurring. In some examples, the profile analyzer 302 receives GPS coordinates from the GPS receiver 120 of the vehicle communications platform 110. For example, an event trigger may be satisfied when the GPS coordinates indicate that the connected vehicle 102 is on (e.g., within a mile of, etc.) a route that is defined by (35°36'04.5"N, 118°30'14.9"W), (35°35'17.3"N, 118°31'34.4"W), and (35°34'49.2"N, 118°33'34.7"W).

The example profile analyzer 302 determines which one(s) of the cameras 126a-126c is/are to the record video segments 130 when the event trigger(s) is satisfied based on the selected camera fields 204a-204c specified by the profile 128. For example, for an event trigger that is satisfied between 8:00 am and 4:30 pm (e.g., that period of time is specified by the time condition field 206a), the camera fields 204a-204c may specify that the forward facing camera 126c is to record the video segments 130.

In the illustrated example, the profile analyzer 302 determines the quality at which the video segments are to be recorded based on the quality fields 208 of the profile 128. In some examples, the quality fields 208 specify a predefine quality setting (e.g., high quality, standard quality, low quality, etc.). In some such examples, the cloud service provider 104 may define (e.g., specify the resolution, the frame rate, etc.) the predefine quality settings based on the capabilities of the cameras 126a-126c. For example, the cloud service provider may define "high quality" to have a resolution of 1080p and a frame rate of 30 fps. As another example, the cloud service provider may define "standard quality" to have a resolution of 640p and a frame rate of 15 fps. As another example, the cloud service provider may define "low quality" to have a resolution of 320p and a frame rate of 0.5 fps. Alternatively, the profile 128 may define a custom video quality by specifying a particular resolution and/or a particular frame rate.

In some examples, the profile analyzer 302 dynamically controls the quality of the video segments 130 being recorded. For example, the quality fields 208 of the profile 128 may specify that the profile analyzer 302 is to control the quality (e.g., though selection of an "automatic" option, etc.). As another example, the profile analyzer 302 may dynamically control the quality when the event trigger(s) is/are not satisfied (e.g., when the default settings are being used). In some examples, situations for which the profile analyzer 302 is to change the quality are provided by the cloud service provider 104 via the recording server 106. For example, the profile analyzer 302 may determine that the camera(s) 126a-126c is/are to increase the resolution used to record the video segments 130 when inclement weather (e.g., rain, snow, hail, etc.) is detected (e.g., via a message from the recording server). As another example, the profile analyzer 302 may determine that the frame rate is to be decreased when cruise control is engaged and/or increased when the anti-lock brakes engage.

In the illustrated example, when one of the event triggers is satisfied, the profile analyzer 302 sends a record instruction 312a to the recording manager 310 and/or sends a storage instruction 314 to the storage manager 306. These instructions 312a, 314 set the recording manager 310 and/or the storage manager 306 according to the profile 128. The example record instructions 312a specify (a) with which quality settings the recording manager 310 is to use to record the video segments 130 and/or (b) the length (e.g., in bytes, in time, etc.) of the video segments 130 (e.g., based on the video segment length field 210 of the profile 128). The example storage instructions 314 specify (a) when the example storage manager 306 is to upload the video segments 130 (e.g. based on the video segment upload fields 214a-214c of the profile) and/or (b) how the video segments 130 are to be stored (e.g., based on the buffer loop size field 212 of the profile 128). Additionally, the example profile analyzer 302 sends the example record instruction 312a and/or the example storage instruction 314 when the trigger event is no longer satisfied. These instructions 312a, 314 reset the recording manager 310 and/or the storage manager 306 according to default settings.

In the illustrated example, the storage manager 306 manages the video segments 130 stored in the segment storage 308. The example segment storage 308 is non-volatile memory that stores the video segments 130. For example, the segment storage 308 may be a 64 gigabyte (GB) solid state drive. To manager the segment storage 308, the storage manager 306 stores video segments 130 received from the recording manager 310, sends the video segments 130 to the vehicle communications platform 110 to be uploaded to the recording server 106, and/or deletes the video segments 130 from the segment storage 308. In some examples, the video segments 103 recorded because of the profile 128 are marked as important. The example storage manager 306 stores the video segments 130 in the circular buffer of the segment storage 308 until the circular buffer is full. When the circular buffer is full, the storage manager 306 stores a new video segment 130 by overwriting an eligible video segment 130 in the circular buffer. The eligible video segment 130 is the oldest video segment 130 in the circular buffer that is not marked as important.

The example storage manager 306 generates one or more circular buffers in the example segment storage 308. In some examples, a portion of the segment storage 308 is reserved to be a circular buffer for video segments 130 associated with the profile 128 and/or a particular set of parameters 202 of the profile 128. In some such examples, the amount of the reserved segment storage 308 is specified by the storage instruction 314 received from the profile analyzer 302. In some examples, the storage manager 306 tracks the amount of free space (e.g., the amount of memory left until older video segments 130 start getting written over) in the circular buffer. In some such examples, when a threshold amount of space in the circular buffer has been filled, the storage manager 306 sends a record instruction 312b to the recording manager 310 to reduce the quantity of the video segments 130 and/or reduce the frame rate of the video segments 130. For example, when the storage manager 306 detects that the circular buffer is 80% full (e.g., 51 GB out of 64 GB, etc.), the storage manager 306 may send the record instruction 312b to the recording manager 310 that causes the recording manager to reduce the resolution used to capture the video segments from 640p to 320p. In some examples, the storage manager 306 may maintain multiple capacity thresholds that cause the storage manager 306 to further reduce the quality and/or frame rate of the video segments 130. For example, the storage manager 306 may have a first capacity threshold at 80% capacity, and a second capacity threshold at 90% capacity. In some examples, the storage manager 306 sends another record instruction 312b to increase the quality of the video segments 130 after the video segments 130 in the circular buffer are uploaded to the recording server 106.

In some example, the storage manager 306 prevents some of the video segments 130 from being overwritten when the corresponding circular buffer is full. In some such examples, the storage manager 306 may prioritize video segments 130 captured as a result a trigger event specified by the profile 128 over video segments 130 captured using the default settings. For example, when one of the video segments 130 in the circular buffer is to be overwritten, the storage manager 306 may select to overwrite the oldest video segment 130 captured using the default settings.

In the illustrated example, the storage manager 306 is communicatively coupled to the vehicle communications platform 110. The example storage instructions 314 received from the example profile analyzer 302 specify when the example storage manager 306 is to upload the video segments 130 stored in the segment storage 308 to the recording server 106 (e.g., via the vehicle communications platform 110). The examples storage instructions 314 may specify that the video segments 130 are to be uploaded (a) when the connected vehicles 102 is connected to a WLAN, (b) as soon as possible, (c) periodically (e.g., every hour, every day, etc.), and/or (d) when the a certain time period has elapsed and/or a certain distance has been traveled). In some examples, by default, the storage manager 306 uploads the video segments 130 from the segment storage 308 when the vehicle communication platform 110 is connected to the WLAN via the WLAN communication device 118 (FIG. 1). When the video segments 130 are successfully uploaded to the recording server 106, the example storage manager 306 deletes those video segments 130 from the example segment database 308.

In the illustrated example of FIG. 3, the recording manager 310 is communicatively coupled to the cameras 126a-126c. The example recording manager 310 receives the record instructions 312a, 312b from the example profile analyzer 302 and/or the example storage manager 306 that specify which of the cameras 126a-126c are to record the video segments 130 and/or what quality settings the cameras 126 are to use. For example, the record instructions 312a may specify the forward facing camera 126c and the interior camera 126b. The example recording manager 310 adjusts the quality settings of the example selected cameras 126a-126c according to the example record instructions 312a, 312b. In some examples, the recording manager 310 prioritizes the record instructions 312a received from the profile analyzer 302 over the record instructions 312b received from the storage manager 306. The example recording manager 310 receives the recorded video segments 130 from the selected cameras 126a-126c and forwards the video segments 130 to the example storage manager 306.

While an example manner of implementing the on-vehicle recording system 114 of FIG. 1 is illustrated in FIG. 3, one or more of the elements, processes and/or devices illustrated in FIG. 3 may be combined, divided, re-arranged, omitted, eliminated and/or implemented in any other way. Further, the example profile analyzer 302, the example storage manager 306, the example recording manager 310 and/or, more generally, the example on-vehicle recording system 114 of FIG. 1 may be implemented by hardware, software, firmware and/or any combination of hardware, software and/or firmware. Thus, for example, any of the example profile analyzer 302, the example storage manager 306, the example recording manager 310 and/or, more generally, the example on-vehicle recording system 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example profile analyzer 302, the example storage manager 306, and/or the example recording manager 310 is/are hereby expressly defined to include a tangible computer readable storage device or storage disk such as a memory, a digital versatile disk (DVD), a compact disk (CD), a Blu-ray disk, etc. storing the software and/or firmware. Further still, the example on-vehicle recording system 114 of FIG. 1 may include one or more elements, processes and/or devices in addition to, or instead of, those illustrated in FIG. 3, and/or may include more than one of any or all of the illustrated elements, processes and devices.

Figure 4:
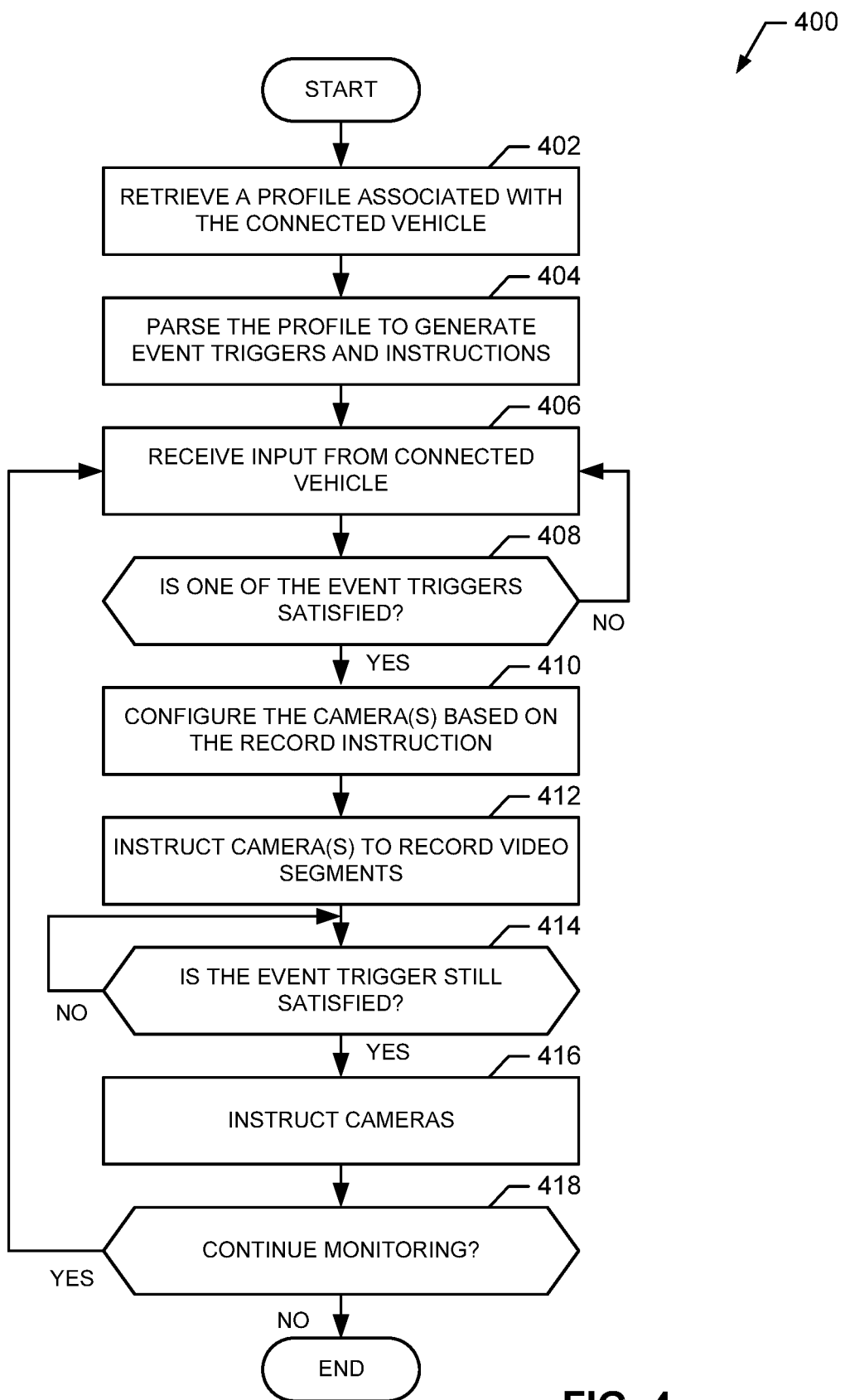
FIG. 4 is a flow diagram representative of example machine readable instructions that may be executed to implement the example on-vehicle recording system of FIGS. 1 and/or 3 to manage recording by the connected vehicle.
Figure 5:
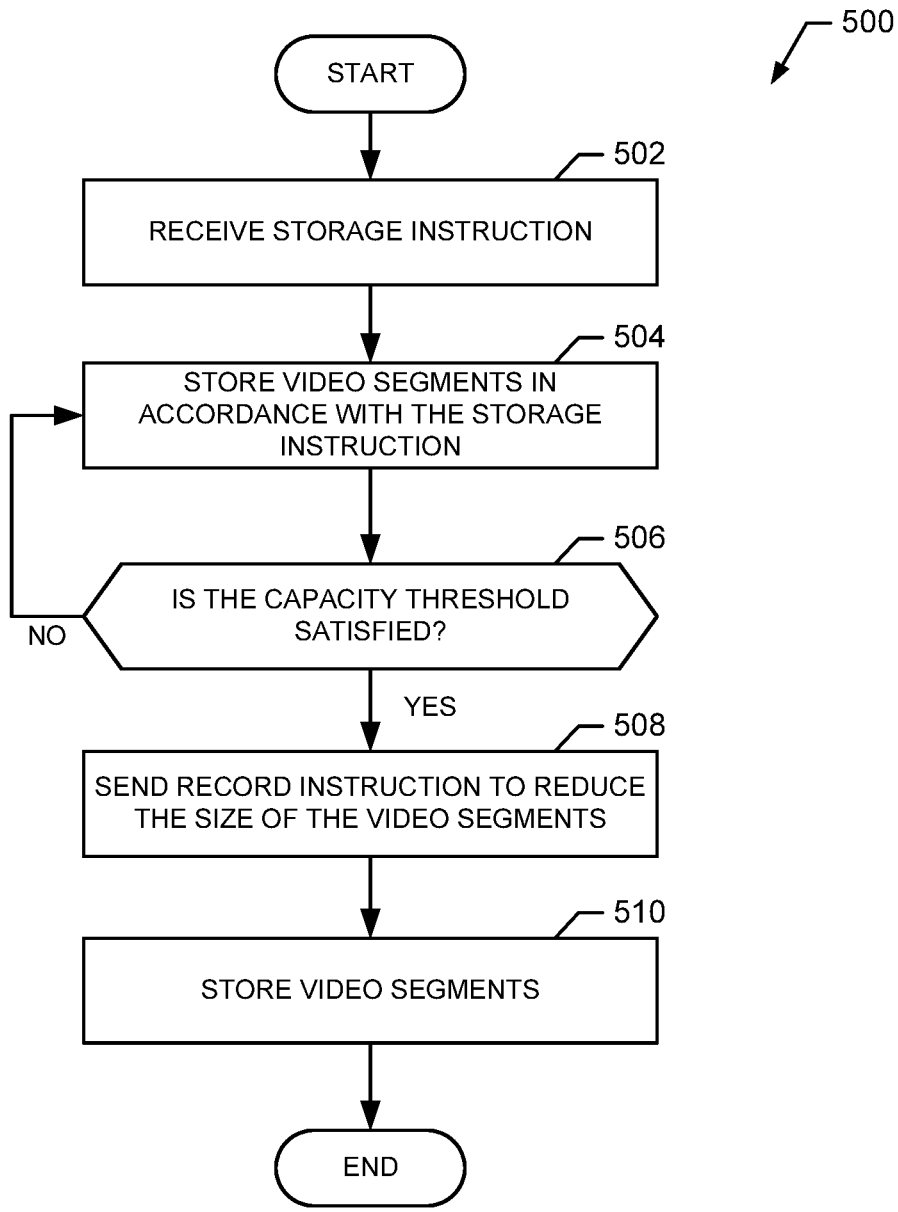
FIG. 5 is a flow diagram representative of example machine readable instructions that may be executed to implement the example storage manager of FIG. 3 to manage storing the video segments.

Flowcharts representative of example machine readable instructions for implementing the example on-vehicle recording system 114 of FIGS. 1 and 3 are shown in FIGS. 4 and 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4 and 5, many other methods of implementing the example on-vehicle recording system 114 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flow diagram representative of example machine readable instructions that may be executed to implement the example on-vehicle recording system 114 of FIGS. 1 and/or 3 to record video segments 130 (FIGS. 1 and 3) by the connected vehicle 102 (FIG. 1). Initially, the example profile analyzer 302 (FIG. 3) retrieves the profile 128 associated with the connected vehicle 102 (block 402). In some examples, the profile analyzer 302 retrieves the profile 128 from the profile database 304 (FIG. 3). Alternately, in some examples, the profile analyzer 302 requests the profile 128 from the recording server 106 (FIG. 1) to ensure that profile analyzer 302 has the most up-to-date profile 128. The example profile analyzer 302 parses the profile 128 to generate the event trigger(s) and instructions (e.g., the record instruction 312a and/or the storage instructions 314 of FIG. 3) based on the set(s) of parameters 202 (FIG. 2) in the profile 128 (block 404). For example, the profile analyzer 302 may generate one of the event triggers based on the condition fields 206a-206d of one of the sets of parameters 202 of the profile 128. The profile analyzer 302 may also generate, for example, the record instruction 312a based on the camera fields 204a-204c, the quality fields 208, and/or the video segment length field 210 of the one of the sets of parameters 202 (FIG. 2) of the profile 128.

The example profile analyzer 302 receives input from the connected vehicle 102 (block 406). For example, the profile analyzer 302 may receive information from (a) the sensors 124a, 124b (e.g., a speedometer, an accelerator position sensor, a barometric pressure sensor, an ambient temperature sensor, ultrasonic sensors, LIDAR, weight sensors, etc.) via the on-vehicle computing system 112 (FIG. 1), (b) systems (e.g. driver profile determination systems, etc.) of the connected vehicle 102, and/or (c) the GPS receiver 120 (FIG. 1) via the vehicle communications platform 110). The example profile analyzer 302 determines whether one of the event triggers generated at block 404 is satisfied by the input from the connected vehicle 102 received at block 406 (block 408). For example, one of the event triggers may be satisfied when the GPS receiver 120 indicates that the connected car 102 is within five miles of (45°31'21.1"N, 122°40'23.3"W).

The example recording manager 310 configures the camera(s) 126a-126c based on the record instruction 312a received from the profile analyzer 302 (block 410). For example, the recording manager 310 may configure the front-facing camera 126c to record video segments 130 at a resolution of 720p and a frame rate of 24 fps. The example recording manager 310 instructs the camera(s) 126a-126c to record video segments 130 (block 412).

The profile analyzer 302 waits until the event trigger is not satisfied (block 414). When the event trigger is no longer satisfied, the example profile analyzer 302 sends the record instruction 312a to the example recording manager 310 and the example recording manager 310 instructs the camera(s) 126 (block 416). In some examples, if a default configuration is defined, the recording manager 310 configures the camera(s) 126a-126c to the default settings. Alternatively, in some examples, the recording manager 310 instructs the camera(s) 126a-126c not to record video segments 130. The profile analyzer 302 then determines whether to continue monitoring for the event trigger(s) (block 418). If the example profile analyzer 302 is to continue monitoring for the event trigger(s), the example profile analyzer 302 receives input from the connected vehicle 102 (block 406). Otherwise, program 400 sends.

FIG. 5 is a flow diagram representative of example machine readable instructions that may be executed to implement the example storage manager 306 of FIG. 3 to manage storing the video segments 130 (FIGS. 1 and 3). Initially, the example storage manager 306 receives the example storage instruction 314 (FIG. 3) from the example profile analyzer 302 (block 502). When the example storage manager 306 receives one of the video segments 103, the example storage manager 306 stores the video segment 130 in the circular buffer of the segment storage 308 (FIG. 3) in accordance with the storage instruction 314 (block 504). For example, the video segment 130 may be marked as important and/or may be stored in a particular portion of the segment storage 308 (e.g., a particular circular buffer, etc.) reserved for the corresponding profile 128 (FIGS. 1 and 3).

The example storage manager 306 determines if the size (e.g., in bytes) of the video segments 130 stored in the circular buffer satisfies (e.g., is greater than or equal to) the capacity threshold (block 506). For example, the capacity threshold may be 102 GB. If the capacity threshold is satisfied, the example storage manager 306 sends the record instruction 312b (FIG. 3) to the example recording manager 310 (FIG. 3) (block 508). The example record instruction 312b specifies a change in quality settings to make the video segments 130 smaller. For example, the record instruction 312b may specify that the camera(s) 126a-126c (FIGS. 1 and 3) are to record video at 320p at 12 fps instead of 640p at 24 fps. Otherwise, the example storage manager 306 continues to store the video segment 130 in the circular buffer in accordance with the storage instruction 314 (block 506). The example storage manager 306 stores the reduced-quality video segments 130 in the circular buffer (block 510).

Figure 6:
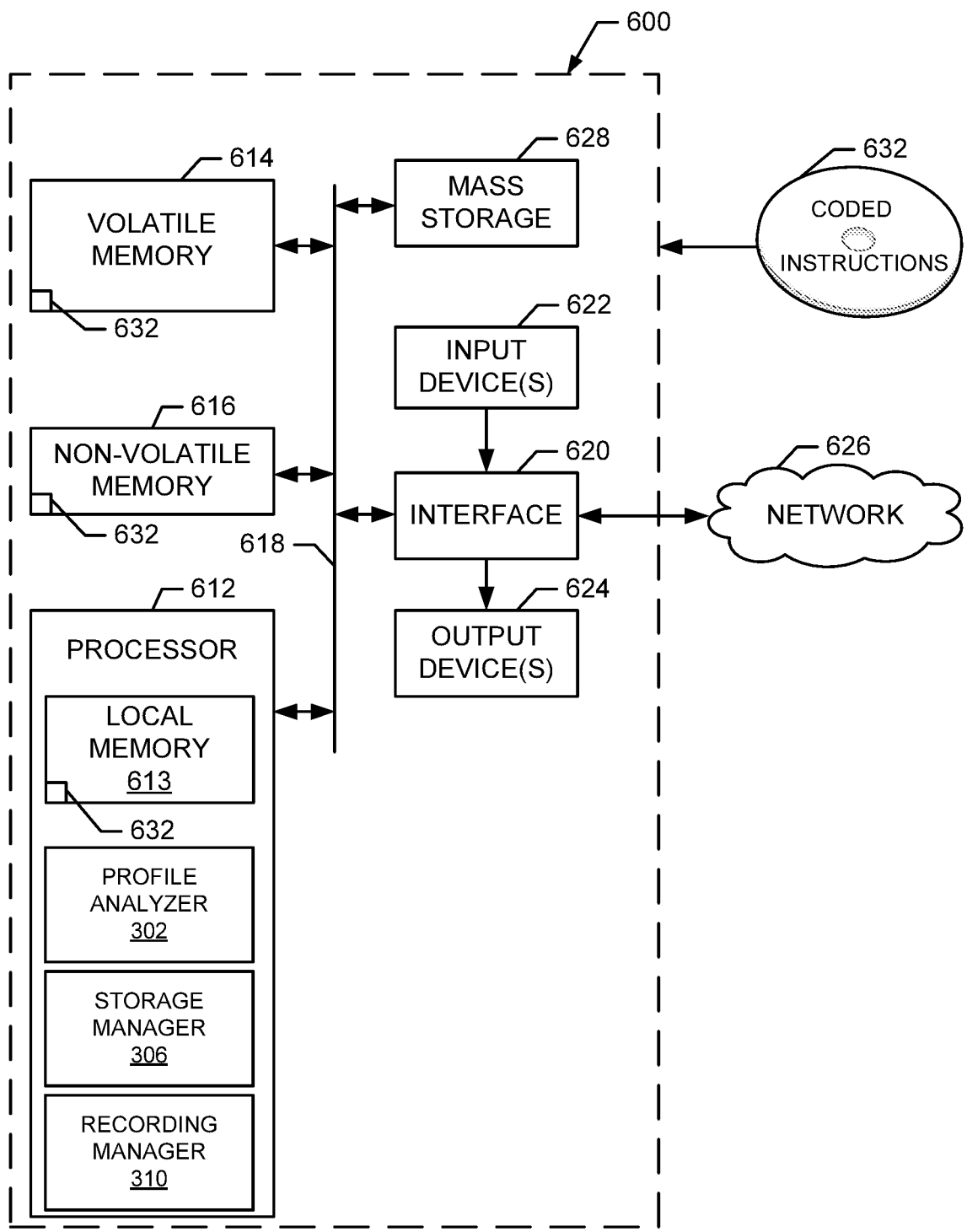
FIG. 6 is a block diagram of an example processor system structured to execute the example machine readable instructions represented by FIGS. 4 and/or 5 to implement the example on-vehicle recording system of FIGS. 1 and/or 3.

FIG. 6 is a block diagram of an example processor platform 600 structured to execute the instructions of FIGS. 4 and/or 5 to implement the on-vehicle recording system 114 of FIGS. 1 and/or 3. The processor platform 600 can be, for example, can be implemented by one or more integrated circuits, logic circuits, microprocessors or controllers from any desired family or manufacturer.

The processor platform 600 of the illustrated example includes a processor 612. The processor 1012 of the illustrated example is hardware. For example, the processor 612 can be implemented by one or more integrated circuits, logic circuits, microprocessors or controllers from any desired family or manufacturer. In the illustrated example, the processor 612 is structured to include the example profile analyzer 302, the example storage manager 306 and the example recording manager 310.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

The interface circuit 1020 of the illustrated example includes a communication device such as a transmitter, a receiver, a transceiver, and/or network interface card to facilitate exchange of data with external machines (e.g., the vehicle communications platform 110, the on-vehicle computing system 112, any other suitable machine, etc.) via a network 626 (e.g., an Ethernet connection, a CAN bus, etc.).

The processor platform 600 of the illustrated example also includes one or more mass storage devices 628 for storing software and/or data. Examples of such mass storage devices 628 include hard drive disks, and solid state drives, etc.

Coded instructions 632 of FIGS. 4 and/or 5 may be stored in the mass storage device 628, in the volatile memory 614, in the non-volatile memory 616, and/or on a removable tangible computer readable storage medium such as a CD or DVD.

From the foregoing, it will appreciate that examples have been disclosed which allow an owner of a connected vehicle to generate a profile via a cloud based service to specify when to record video segments. Based on the profile, the connected vehicle records the video segments without further intervention by the owner. The owner may view the video segments via the cloud based service. Examples have been disclosed which manage the utilization of memory within the connected vehicle efficiently to record and preserve the video segments that are important to the owner.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of recording videos, the method comprising:
accessing, with an on-vehicle processor associated with a vehicle, a profile specifying a video quality and a condition, the profile stored in a profile database of the on-vehicle processor, the video quality selected by a user of the vehicle, wherein the profile is associated with a connected vehicle identifier and a subscriber identifier, the vehicle identifier uniquely identifies the vehicle, and the subscriber identifier uniquely identifies the user; and
when an event trigger is generated based on a reading from an on-vehicle sensor and the condition, instructing, with the on-vehicle processor, an on-vehicle recording system to adjust a camera of the on-vehicle recording system to record a video at the video quality, the camera to capture video images exterior to the vehicle.

2. The method of claim 1, wherein the video quality is a first video quality, and further including causing the on-vehicle recording system to override a default recording parameter until the event trigger is no longer satisfied based on a subsequent reading from the on-vehicle sensor, the default recording parameter specifying a second video quality.

3. The method of claim 1, further comprising in response to detection of a connection to a remote recording server having a defined connection speed, uploading the video images to the recording server.

4. The method of claim 1, wherein the condition is an ambient condition existing outside of the vehicle, the video quality is associated with a first video quality level higher than a default second video quality level, the event trigger is generated when the on-vehicle sensor indicates the ambient condition is associated with inclement weather, and the instructing includes instructing the on-vehicle recording system to adjust the camera to record the video at the first video quality level.

5. The method of claim 1, wherein the vehicle is a first vehicle, the condition identifies a threshold speed of approach of a second vehicle to the first vehicle and a threshold proximity of the second vehicle to the first vehicle, and the event trigger is generated when the threshold speed is satisfied and the threshold proximity is satisfied, the on-vehicle sensor being a short range radar sensor disposed on the first vehicle.

6. The method of claim 1, wherein the condition is the vehicle being driven by a first driver of a plurality of drivers associated with the vehicle, the reading is a weight reading from a weight sensor associated with a driver's seat of the vehicle, and the event trigger is generated when the weight reading corresponds to a weight of the first driver, the weight of the first driver stored in the profile.

7. The method of claim 1, wherein the condition identifies a first time range and a second time range, the event trigger is generated when the vehicle is operated during either of the first time range and the second time range, and the video quality includes a first video quality and a second video quality, the first video quality to be used to record video when the vehicle is operated during the first time range and the second video quality to be used to record video when the vehicle is operated during the second time range.

8. An apparatus to record video, the apparatus comprising:
an on-vehicle sensor;
an on-vehicle recording system including a camera;
an on-vehicle processor;
an on-vehicle memory including instructions that, when executed, cause the on-vehicle processor to perform operations including:
accessing a profile specifying a video quality and a condition, the profile stored in a profile database, the video quality selected by a user of a vehicle, wherein the profile is associated with a vehicle identifier and a subscriber identifier, the vehicle identifier uniquely identifies the vehicle, and the subscriber identifier uniquely identifies the user; and when an event trigger is generated based on a reading from the on-vehicle sensor and the condition, instructing the on-vehicle recording system to adjust the camera to record a video at the video quality, the camera to capture video images exterior to the vehicle.

9. The apparatus of claim 8, wherein the video quality is a first video quality, and the on-vehicle processor is further to cause the on-vehicle recording system to override a default recording parameter until the event trigger is no longer satisfied based on a subsequent reading from the on-vehicle sensor, the default recording parameter to specify a second video quality.

10. The apparatus of claim 8, wherein the operations further comprise in response to determining that the vehicle has reached a geographic checkpoint along a defined route, uploading the video images to a recording server.

11. The apparatus of claim 8, wherein the condition is an ambient condition existing outside of the vehicle, the event trigger is generated when the on-vehicle sensor indicates the ambient condition is associated with inclement weather, and the on-vehicle processor is to instruct the on-vehicle recording system to adjust the camera to record the video at a high quality level.

12. The apparatus of claim 8, wherein the vehicle is a first vehicle, the condition identifies a threshold speed of approach of a second vehicle to the first vehicle, and a threshold proximity of the second vehicle to the first vehicle, and the event trigger is generated when the threshold speed is satisfied and the threshold proximity is satisfied, the on-vehicle sensor being a short range radar sensor disposed on the first vehicle.

13. The apparatus of claim 8, wherein the condition is the vehicle being driven by a first driver of a plurality of drivers associated with the vehicle, the reading is a weight reading from a weight sensor associated with a driver's seat of the vehicle, the event trigger is generated when the weight reading corresponds to a weight of the first driver, the weight of the first driver stored in the profile.

14. The apparatus of claim 8, wherein the condition identifies a first time range and a second time range, the event trigger is generated when the vehicle is operated during either of the first time range and the second time range, the video quality includes a first video quality and a second video quality, and the first video quality to be used to record video when the vehicle is operated during the first time range and the second video quality to be used to record video when the vehicle is operated during the second time range.

15. A tangible computer readable storage medium including instructions that, when executed, cause an on-vehicle processor associated with a vehicle to perform operations comprising:

accessing a profile specifying a video quality and a condition, the profile stored in a profile database, the video quality selected by a user of the vehicle, wherein the profile is associated with a vehicle identifier and a subscriber identifier, the vehicle identifier identifies the vehicle, and the subscriber identifier identifies the user; and when an event trigger is generated based on a reading from an on-vehicle sensor and the condition, instructing an on-vehicle recording system to adjust a camera of the on-vehicle recording system to record a video at the video quality, the camera to capture video images exterior to the vehicle.

16. The tangible computer readable storage medium of claim 15, wherein the video quality is a first video quality, and the instructions cause the on-vehicle processor to cause the on-vehicle recording system to override a default recording parameter until the event trigger is no longer satisfied based on a subsequent reading from the on-vehicle sensor, the default recording parameter to specify a second video quality.

17. The tangible computer readable storage medium of claim 15, wherein the video quality is associated with a resolution and a frame rate.

18. The tangible computer readable storage medium of claim 15, wherein the condition is an ambient condition existing outside of the vehicle, the event trigger is generated when the on-vehicle sensor indicates the ambient condition is associated with inclement weather, and the instructions, when executed, cause the on-vehicle processor to instruct the on-vehicle recording system is to adjust the camera to record the video at a high video quality level.

19. The tangible computer readable storage medium of claim 15, wherein the vehicle is a first vehicle, the condition identifies a threshold speed of approach of a second vehicle to the first vehicle, and a threshold proximity of the second vehicle to the first vehicle, and the event trigger is generated when the threshold speed is satisfied and the threshold proximity is satisfied, the on-vehicle sensor being a short range radar sensor disposed on the first vehicle.

20. The tangible computer readable storage medium of claim 15, wherein the condition is the vehicle being driven by a first driver of a plurality of drivers associated with the vehicle, the reading is a weight reading from a weight sensor associated with a driver's seat of the vehicle, the event trigger is generated when the weight reading corresponds to a weight of the first driver, the weight of the first driver stored in the profile.

* * * * *